United States Patent
Schmidt

(10) Patent No.: US 7,646,119 B2
(45) Date of Patent: Jan. 12, 2010

(54) ELECTRIC MACHINE WITH ROTOR COOLING AND CORRESPONDING COOLING METHOD

(75) Inventor: Valerias Schmidt, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 178 days.

(21) Appl. No.: 10/566,859

(22) PCT Filed: Jul. 23, 2004

(86) PCT No.: PCT/EP2004/008298

§ 371 (c)(1),
(2), (4) Date: Feb. 1, 2006

(87) PCT Pub. No.: WO2005/013459

PCT Pub. Date: Feb. 10, 2005

(65) Prior Publication Data

US 2007/0024130 A1  Feb. 1, 2007

(30) Foreign Application Priority Data

Aug. 1, 2003   (DE) .............................. 103 35 038

(51) Int. Cl.
*H02K 9/06* (2006.01)
(52) U.S. Cl. .............................. 310/61; 310/58; 310/57
(58) Field of Classification Search .................. 310/58, 310/52, 57, 61; *H02K 9/06*
See application file for complete search history.

(56) References Cited

U.S. PATENT DOCUMENTS

| | | | | |
|---|---|---|---|---|
| 2,610,992 A | | 9/1952 | Johns et al. | |
| 3,629,628 A | * | 12/1971 | Rank et al. | 310/54 |
| 4,114,059 A | * | 9/1978 | Albaric et al. | 310/54 |
| 4,364,241 A | * | 12/1982 | Okamoto et al. | 62/505 |
| 4,369,386 A | * | 1/1983 | Lurie et al. | 310/54 |
| 5,424,593 A | * | 6/1995 | Vaghani et al. | 310/64 |
| 5,825,110 A | * | 10/1998 | Page | 310/90 |
| 5,889,342 A | * | 3/1999 | Hasebe et al. | 310/54 |
| 5,925,960 A | * | 7/1999 | Hayes | 310/211 |
| 6,087,745 A | * | 7/2000 | Dreher | 310/58 |
| 6,300,693 B1 | * | 10/2001 | Poag et al. | 310/54 |
| 6,891,290 B2 | * | 5/2005 | Nagayama et al. | 310/58 |

FOREIGN PATENT DOCUMENTS

| | | |
|---|---|---|
| DE | 158 006 C | 1/1905 |
| DE | 44 13 389 | 12/1994 |

(Continued)

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

The aim of the invention is to optimize cooling of a rotor using simple means. A rotor is provided, comprising rotor pressure rings (1) such that at least one of the two rotor pressure rings (1) is configured in order to enable targeted guiding of the coolant through the axial bores (3, 3') in the rotor. In a special embodiment, the rotor pressure ring (1) can be formed in such a manner that it produces, in several bores (3') in the rotor sheet stack (8), a flow of coolant in a first direction and in other bores (3), a flow of coolant in the other direction. An even, opposite flow cooling can be exclusively obtained by the contour of the rotor pressure ring (1).

16 Claims, 3 Drawing Sheets

FOREIGN PATENT DOCUMENTS

| | | |
|---|---|---|
| DE | 10 107 298 C1 | 7/2002 |
| FR | 1 350 043 A | 1/1964 |
| JP | 59220046 | 12/1984 |
| JP | 08214500 A * | 8/1996 |
| JP | 09084301 A * | 3/1997 |
| JP | 09 093868 A | 4/1997 |
| JP | 09093868 A * | 4/1997 |
| JP | 2002 125352 | 4/2002 |
| JP | 2002125352 A * | 4/2002 |
| WO | WO 02/071578 A | 9/2002 |

* cited by examiner

B-B

A-A

ELECTRIC MACHINE WITH ROTOR COOLING AND CORRESPONDING COOLING METHOD

BACKGROUND OF THE INVENTION

The present invention relates to a rotor device with a laminated core arrangement, which has a plurality of axial bores for the conduction of a coolant, and with two rotor pressure rings, between which the laminated core arrangement is fixed axially. The present invention relates, furthermore, to an electric machine having a rotor device of this type and to a corresponding method for cooling a rotor device.

Where electric machines of higher power are concerned, rotor cooling is often necessary. A corresponding electric machine is known, for example, from the document U.S. Pat. No. 2,610,992. The stator and rotor laminated cores described there have air cooling ducts running axially.

In order to execute ventilation more uniformly in the axial direction, ventilation of the rotor on both sides may be provided. The German laid-open publication DE 44 13 389 describes, for example, such an electric machine. It possesses two rotor laminated cores arranged at an axial distance from one another on a common shaft, two stator laminated cores arranged at a corresponding distance from one another and a cooling device which has an air conveyance device and cooling ducts running in the axial direction. The latter, as a result of the axial distance between the laminated cores, are subdivided in each case in two portions and are connected to the air conveyance device in such a way that the flow passes through the two portions of each cooling duct in opposite directions. In the annular space between the laminated cores, the cooling air is deflected from an axial direction into a radial direction, or vice versa. The axial distance between the laminated cores is in this case selected such that the flow cross section available in the annular space between the laminated cores for the cooling air is approximately equal to the sum of the flow cross sections of all the cooling ducts issuing directly into this annular space. However, this type of contradirectional cooling is highly complicated.

SUMMARY OF THE INVENTION

The object of the present invention is, therefore, to propose a rotor device which can be cooled contradirectionally by means of a relatively cost-effective construction. Furthermore, a corresponding cooling method is to be specified.

According to the invention, this object is achieved by means of a rotor device having a laminated core arrangement, which has a plurality of axial bores for the conduction of a coolant, and with two rotor pressure rings, between which the laminated core arrangement is fixed axially, at least one of the two rotor pressure rings being configured for the targeted routing of coolant through the axial bores.

Furthermore, according to the invention, a method is provided for cooling a rotor device with a laminated core arrangement, which has a plurality of axial bores for the conduction of a coolant, and with two rotor pressure rings, between which the laminated core arrangement is fixed axially, by the conduction of the coolant through the axial bores, the coolant being routed in a targeted manner through the axial bores by means of at least one of the two rotor pressure rings.

Advantageously, a separation of the air inlet holes from the air outlet holes of the rotor cooling routing in the case of contradirectional cooling can consequently be achieved in a relatively cost-effective way. To be precise, the rotor pressure ring or rotor pressure rings may be integrated into the air routing device.

Preferably, the axial bores are combined into a plurality of groups by means of at least one of the two rotor pressure rings, so that the coolant stream through the bores of each group is essentially identical. By the individual bores being grouped together, the coolant flow is improved. For example, in each case two, three or four bores, but even more, if desired, can be combined in each group.

Furthermore, the targeted coolant routing may be configured such that the bores or groups of bores are cooled contradirectionally with respect to one another. This leads to a more uniform cooling of the rotor in the axial direction.

Furthermore, radii for improving the coolant flow are formed, in particular cast on, at predetermined edges of the at least one rotor pressure ring.

In a particularly advantageous embodiment, the at least one rotor pressure ring may be configured as a fan. The rotor pressure ring consequently possesses threefold functionality: pressing together the laminated core, routing the coolant stream and conveying the coolant stream. In this case, it is further advantageous if the at least one rotor pressure ring is produced in one piece. Thus, there are no high production costs of the rotor pressure ring due to a large number of individual parts, welding operations or soldering operations. If, furthermore, the at least one rotor pressure ring is manufactured from spherulitic graphite iron, this results in weight benefits, as compared with conventional solutions.

Two rotor pressure rings of similar configuration may be arranged on a common axis about a bore or a group of bores so as to be offset in a circumferential direction. Contradirectional cooling can thereby be achieved at a low outlay in terms of cost.

Preferably, an electric machine, in particular an electric motor, is equipped with the depicted rotor device according to the invention.

BRIEF DESCRIPTION OF THE DRAWING

The present invention, then, is explained in more detail by means of the accompanying drawings in which.

DETAILED DESCRIPTION OF PREFERRED EMBODIMENTS

Figure 3:
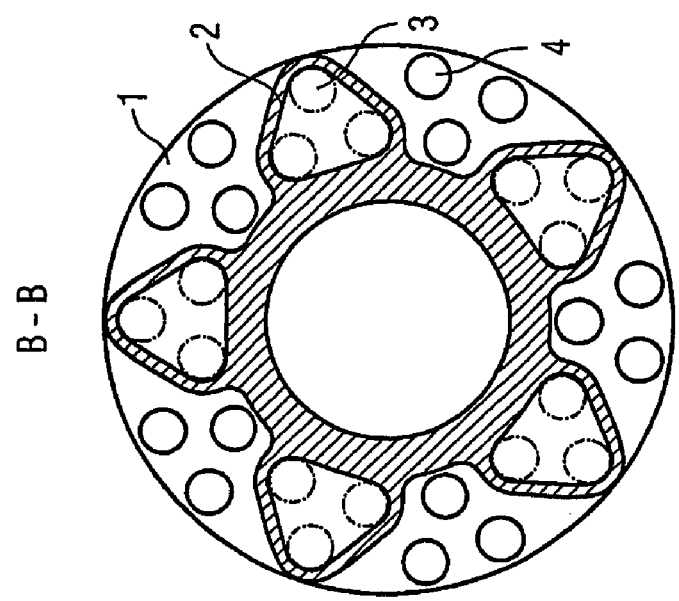
FIG. 3 shows a cross section B-B through the rotor pressure ring of FIG. 2.

The exemplary embodiments described in more detail below constitute preferred embodiments of the present invention.

According to the invention, the rotor pressure ring possesses an additional functionality, to be precise that of routing the coolant through the axial bores of the rotor. A correspondingly configured rotor pressure ring 1 is illustrated in a top view in FIG. 1. Five triangular coolant leadthroughs 2 are arranged on its circumference. In each case three bores 3 are indicated in these coolant passages 2 by a dashed and dotted line and are located in a rotor, not illustrated, arranged behind the rotor pressure ring 1. Thus, by means of the triangular leadthrough 2, in each three holes or bores 3 are combined into a group of holes.

Figure 2:
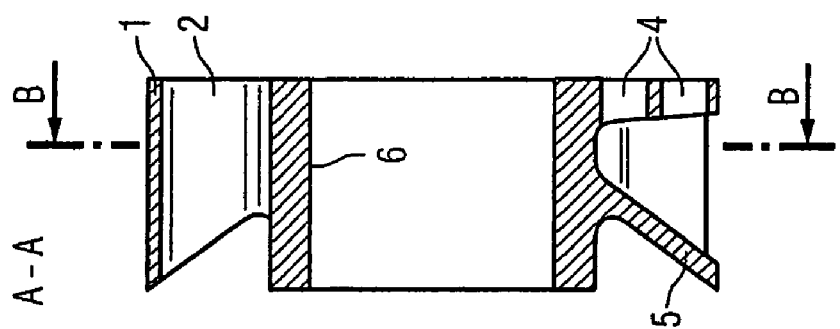
FIG. 2 shows a section A-A through the rotor pressure ring of FIG. 1.

FIG. 2 illustrates the coolant leadthrough 2 in cross section. It is evident from this, furthermore that the contour of the coolant leadthrough 2 runs obliquely in the radial direction. The reason for this is that, owing to fluid mechanics, a flow duct running obliquely outward radially is provided for the coolant, as explained in more detail in connection with FIG. 4.

In a circumferential direction between two coolant leadthroughs 2, in each case three bores 4 are located in the rotor pressure ring 1. These serve for coolant inlet when the bores 3 of the coolant leadthrough 2 serve for coolant outlet from the rotor. As illustrated in FIG. 2, upstream of the bores (in relation to the viewing direction of FIG. 1) are located in each case coolant routing walls 5 which run obliquely and which conceal the bores 4. The obliquely running contour of the coolant routing wall 5 is optimized in terms of flow at the coolant inlet.

Located at the center of the rotor pressure ring is a bore 6 which serves for receiving a shaft of the electric machine.

FIG. 3 illustrates a cross section of the rotor pressure ring 1 along the section B-B of FIG. 2. In this, then, the coolant guides 2 can be seen clearly in section. Since the bores 4 can be seen directly in this view, they are reproduced by an unbroken line. The bores in the rotor lying behind them are again indicated by dashed and dotted lines.

Figure 1:
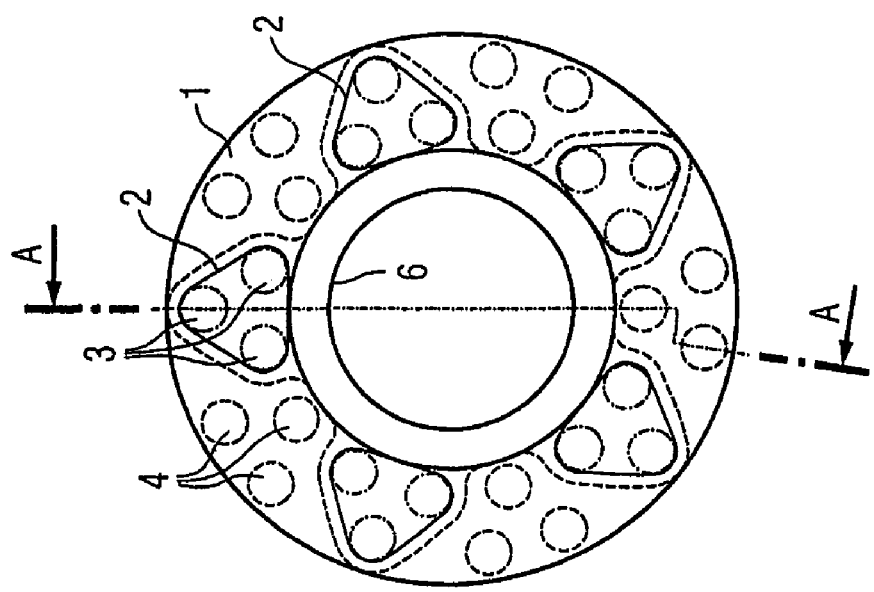
FIG. 1 shows a top view of a rotor pressure ring according to the invention.

The action of the rotor pressure ring 1 can be explained in more detail with reference to FIG. 4. The rotor pressure ring 1 is arranged on the shaft 7 and holds together a rotor laminated core 8. In the rotor laminated core 8 are located the bores 3 (lower half of FIG. 4) which are indicated in FIG. 1 and are connected to the coolant leadthrough 2. The coolant is conveyed according to the arrows reproduced out of the bores 3 through the coolant leadthrough 2 into a static air outlet orifice 9. A frustoconical guide element 10 steers the coolant stream from the coolant leadthrough 2 into the air or coolant outlet orifice 9.

On the radially opposite side of the rotor (upper half of FIG. 4) are located bores 3' which are connected to the bores 4 of the rotor pressure ring 1. Via a coolant inlet nozzle 11, which is stationary with respect to the rotor, and the coolant routing wall 5 of the rotor pressure ring 1, the coolant is again delivered into the bores 3' of the rotor according to the arrows.

Figure 4:
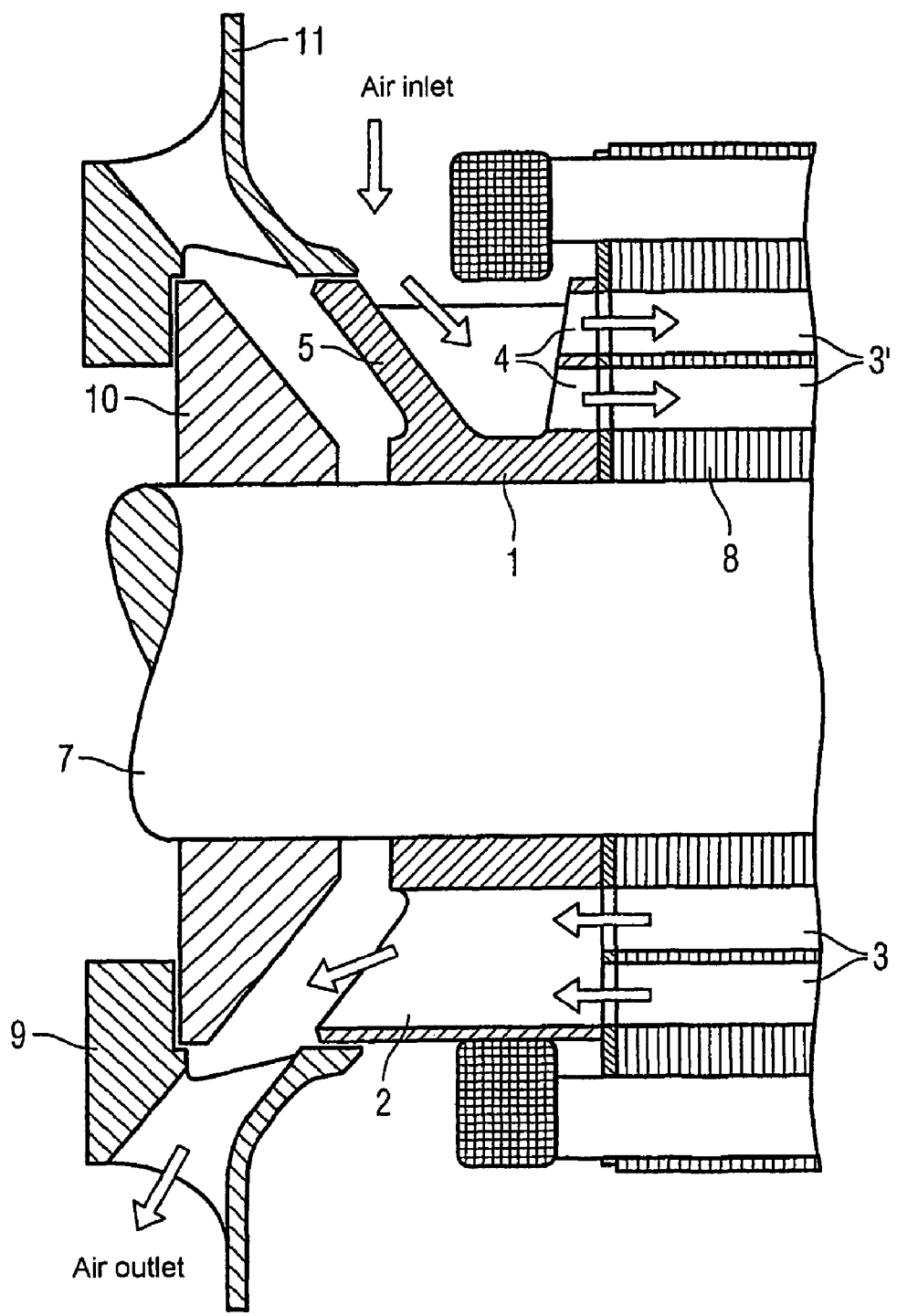
FIG. 4 shows a partial cross-sectional view through an electric machine with rotor cooling according to the invention.

At the other end, not illustrated in FIG. 4, of the rotor laminated core 8, a rotor pressure ring with a similar configuration to that just described is likewise located.

Figure 5:
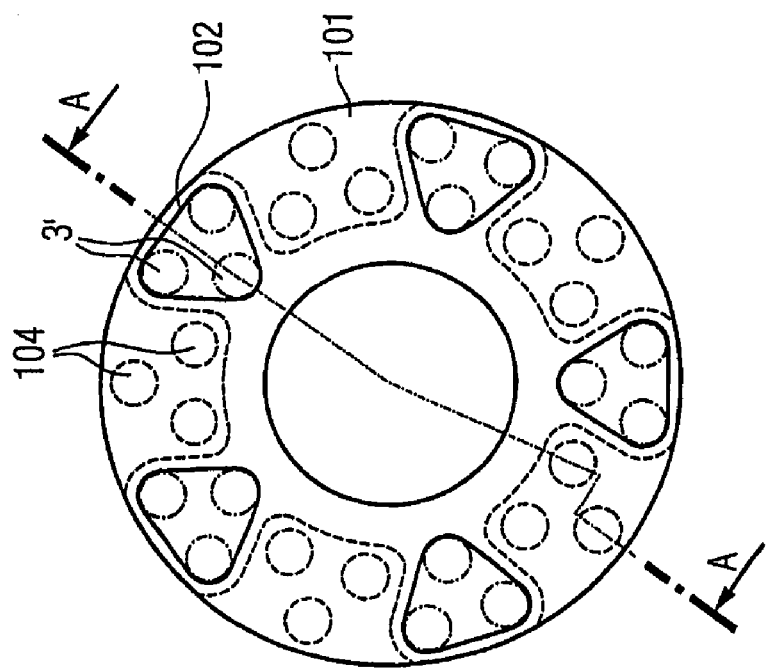
FIG. 5 shows a top view of the rotor pressure ring which illustrates the counterpiece to the ring according to FIG. 1.

FIG. 5 illustrates a rotor pressure ring of this type in a top view, just as in FIG. 1. In its position in the circumferential direction, it is illustrated as it would be mounted as a counter piece to the rotor pressure ring of FIG. 1. This means that the bores 104 of the rotor pressure ring counter piece 101 are connected to the bores 3, indicated in FIG. 1, of the rotor in the coolant leadthrough 2. The bores 3' indicated by means of dashed and dotted lines in the coolant leadthroughs 102, likewise communicate with the bores 4 which are concealed by the coolant routing walls 5 of the rotor pressure ring 1 in FIG. 1.

Figure 6:
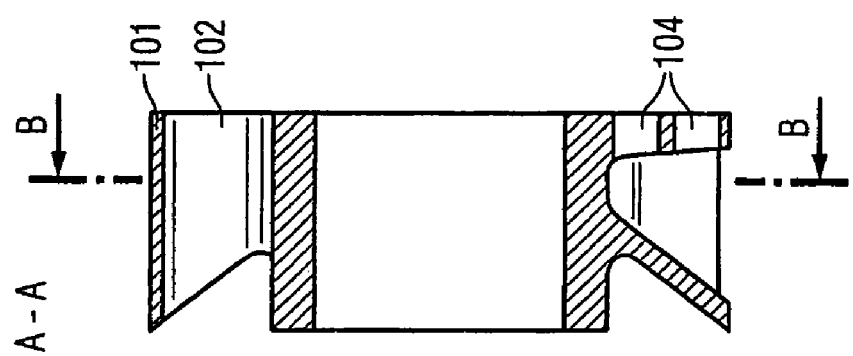
FIG. 6 shows a section A-A through the rotor pressure ring of FIG. 5

FIG. 6 illustrates a section A-A through the rotor pressure ring 101. However, the section is offset at 36° with respect to that of FIG. 1. The sectional image is identical to that of FIG. 2.

Figure 7:
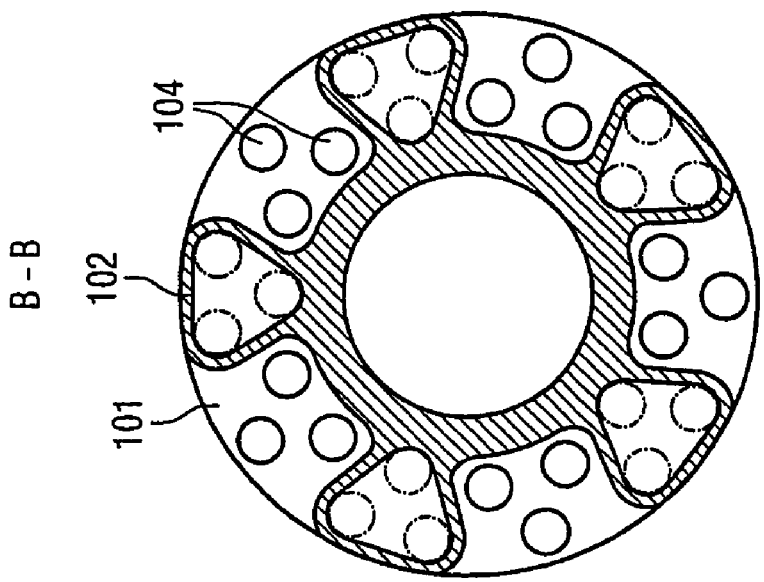
FIG. 7 shows a cross section B-B through the rotor pressure ring of FIG. 6.

FIG. 7 again illustrates a section along the line B-B of FIG. 6. Here, too, coolant leadthroughs 102 are to be seen, distributed on the circumference, in triangular form. The apices of the triangles point inward, in contrast to the triangles of FIG. 3. This configuration therefore has scarcely any fan effect.

Once again, in each case three bores 104 are arranged between the triangular coolant leadthroughs 102.

Since the rotor pressure ring 101 is offset with respect to the rotor pressure ring 101 in the circumferential direction by the amount of one group of holes, that is to say by the amount of three bores, according to FIG. 4 the bores 3' are connected at one end to the coolant inlet and at their other end to the coolant outlet. The same applies correspondingly to the bores 3 at the coolant outlet of FIG. 4. Contradirectional cooling can thereby be achieved without a high outlay in structural terms.

The coolant leadthroughs 2 result in a star-shaped configuration of the rotor pressure ring 1. A fan effect is thereby achieved which conveys the coolant radially outward in each direction of rotation.

With the aid of the coolant leadthroughs 2 or 102, however, groups of holes with two, four or more holes or bores can also be formed. In the case of groups of holes with two or four bores in a selected bore arrangement, the walls of the coolant leadthroughs may likewise be formed obliquely outward, so that a vane wheel for conveying the coolant is obtained at least in one direction of rotation.

To achieve contradirectional cooling, however, it is not necessary for the holes or bores to be combined into groups. Instead, even only a single bore 3 may be provided, downstream of the coolant leadthrough, in the rotor laminated core 8. Here, too, the separation of the coolant streams takes place by means of the walls of the coolant leadthrough 2 and the coolant routing wall 5.

Furthermore, the present invention can also be applied to rotors, the cooling bores of which are arranged in one bore row and in three or more bore rows arranged radially one above the other.

What is claimed is:

1. A rotor device, comprising:
    a shaft defined by an axis;
    a laminated core arrangement mounted on the shaft and having axial bores for conduction of a coolant, and
    two rotor pressure rings mounted on the shaft to secure the laminated core arrangement therebetween, wherein at least one of the two rotor pressure rings is configured for coolant to enter and exit through the axial bores, said rotor pressure ring having a bore assembly which is constructed so that coolant enters the rotor pressure ring in a radial direction on one side of the laminated core arrangement and which is in fluid communication with a first one of the axial bores to conduct coolant in one axial direction in parallel relationship to the shaft for subsequent exit of coolant in a radial direction on an opposite side of the laminated core arrangement, a coolant leadthrough configured to deflect coolant, entering in the radial direction on the opposite side of the laminated core arrangement into a second one of the axial bores to flow in another axial direction parallel to the shaft in opposition to the one axial direction, for exit of coolant in a radial direction on the one side of the laminated core arrangement, and a coolant routing wall which projects obliquely outward away from the bore assembly to conceal the bore assembly in an axial direction and to enhance a flow dynamics for the coolant with respect to the bore assembly.

2. The rotor device as claimed in claim 1, wherein the coolant leadthrough has axial bores fluidly connected in one-to-one correspondence with a group of axial bores of the laminated core arrangement, with a coolant stream through the axial bores of the group being essentially identical.

3. The rotor device as claimed in claim 2, wherein the group has two axial bores.

4. The rotor device as claimed in claim 1, wherein the other one of the rotor pressure rings is of identical construction and arranged at an opposite end of the laminated core arrangement such that the first and second pluralities of axial bores conduct coolant in opposite directions with respect to one another.

5. The rotor device as claimed in claim 1, wherein the at least one of the rotor pressure rings has rounded edges at predetermined areas for improving a coolant flow.

6. The rotor device as claimed in claim 1, wherein the at least one rotor pressure ring is configured as a fan.

7. The rotor device as claimed in claim 6, wherein the at least one rotor pressure ring is constructed in one piece.

8. The rotor device as claimed in claim 1, wherein the at least one rotor pressure ring is made of spheroidal graphite iron.

9. The rotor device as claimed in claim 1, wherein the two rotor pressure rings are of similar configuration and extend on a common axis in such a manner that the rotor pressure rings are disposed in circumferentially offset relationship by a bore.

10. An electric machine having a rotor device as claimed in claim 1.

11. The rotor device as claimed in claim 2, wherein the group has three axial bores.

12. The rotor device as claimed in claim 2, wherein the group has four axial bores.

13. The rotor device as claimed in claim 2, wherein the two rotor pressure rings are of similar configuration and extend on a common axis in such a manner that the rotor pressure rings are disposed in circumferentially offset relationship by the group of bores.

14. The rotor device as claimed in claim 4, wherein the other one of the rotor pressure rings is positioned at opposite ends of the laminated core arrangement at an angular offset of 36° in relation to the one rotor pressure ring.

15. The rotor device as claimed in claim 1, wherein the coolant is air.

16. A rotor device, comprising:
a shaft defined by an axis;
a laminated core arrangement mounted on the shaft and having a plurality of axial bores for conduction of a coolant, and
two rotor pressure rings mounted offset to one another on the shaft at opposite ends of the laminated core arrangement for axial securement of the laminated core arrangement, wherein one of the two rotor pressure rings is configured for routing the coolant through a first one of the axial bores, and the other one of the rotor pressure rings is configured for routing the coolant through a second one of the axial bores, each said rotor pressure ring having a bore assembly which is constructed so that coolant enters the rotor pressure ring in a radial direction on one side of the laminated core arrangement and which is in fluid communication with one of the first and second axial bores to conduct coolant in one axial direction in parallel relationship to the shaft for subsequent exit of coolant in a radial direction on an opposite side of the laminated core arrangement via the other one of the rotor pressure rings, a coolant leadthrough configured to deflect coolant, entering in the radial direction on the opposite side of the laminated core arrangement via the other one of the rotor pressure rings into the other one of the first and second axial bores to flow in another axial direction parallel to the shaft in opposition to the one axial direction for exit of coolant in a radial direction on the one side of the laminated core arrangement via the one rotor pressure ring, and a coolant routing wall which projects obliquely outward away from the bore assembly to conceal the bore assembly in an axial direction and to enhance a flow dynamics for the coolant with respect to the bore assembly.

* * * * *